United States Patent
de Calmes et al.

(10) Patent No.: US 8,361,616 B2
(45) Date of Patent: Jan. 29, 2013

(54) WATER RE-DISSOLVABLE ADHESIVE

(75) Inventors: Nicholas de Calmes, Düsseldorf (DE); Dario Cavalli, Milan (IT); Amelie Colson, Reims (FR); Sandrine Dallalibera, Pogny (FR)

(73) Assignee: Henkel AG & Co. KGaA, Duesseldorf (DE)

( * ) Notice: Subject to any disclaimer, the term of this patent is extended or adjusted under 35 U.S.C. 154(b) by 472 days.

(21) Appl. No.: 12/705,817

(22) Filed: Feb. 15, 2010

(65) Prior Publication Data
US 2010/0209717 A1 Aug. 19, 2010

Related U.S. Application Data

(63) Continuation of application No. PCT/EP2008/059620, filed on Jul. 23, 2008.

(30) Foreign Application Priority Data

Aug. 16, 2007 (EP) .................................. 07016062

(51) Int. Cl.
*B32B 7/12* (2006.01)
*B32B 27/10* (2006.01)
*C08L 93/04* (2006.01)

(52) U.S. Cl. .............. 428/355 AC; 428/221; 428/343; 428/355 EN; 428/355 R; 428/441; 428/461; 428/511; 524/18; 525/223; 525/237; 156/60

(58) Field of Classification Search .............. 428/221, 428/343, 355 AC, 355 EN, 355 R, 441, 461, 428/511; 524/18; 525/223, 227; 156/60
See application file for complete search history.

(56) References Cited

U.S. PATENT DOCUMENTS

| | | |
|---|---|---|
| 3,474,055 A | 10/1969 | Dooley |
| 3,649,581 A | 3/1972 | Mast et al. |
| 5,441,562 A | 8/1995 | Broich et al. |
| 6,238,509 B1 | 5/2001 | Herlfterkamp et al. |
| 2001/0008921 A1 | 7/2001 | Matzinger |

FOREIGN PATENT DOCUMENTS

| | | |
|---|---|---|
| EP | 1025179 A1 | 8/2000 |
| EP | 1054028 A1 | 11/2000 |
| WO | 2009021814 A1 | 2/2009 |

OTHER PUBLICATIONS

English abstract of JP09-328666 A (Dec. 1997).*

* cited by examiner

*Primary Examiner* — Vu A Nguyen
(74) *Attorney, Agent, or Firm* — Sun Hee Lehmann

(57) ABSTRACT

Aqueous adhesive containing, based on solid contents, ~20 to 80% by weight of an (meth)acrylic copolymer (A) as dispersion in water, ~10 to 50% by weight of a resin (B), ~5 to 30% by weight of a reaction product (C) of i) 20 to 50% based on dispersion (C) of an (meth)acrylic copolymer having an acidic number of 1-100 mg KOH/g in form of a dispersion, ii) 5 to 40% based on dispersion (C) of at least one sugar alcohol with a $M_N$ of 100 to 600 g/mol, and reacting the mixture in alkaline solution for 0.1 to 6 hours, and 0.1 to 30% by weight of one or more auxiliaries (D) wherein the sum A to D adds to 100%.

19 Claims, No Drawings

WATER RE-DISSOLVABLE ADHESIVE

CROSS-REFERENCE TO RELATED APPLICATIONS

This application is a continuation of International Application No. PCT/EP2008/059620 filed Jul. 23, 2008 which claims priority to European Patent Application No. 07016062.7 filed Aug. 16, 2007, the contents of both of which are incorporated herein by reference.

This invention relates to aqueous adhesive materials comprising specific natural polymers for bonding paper or film substrates to hard surfaces, more particularly plastic surfaces or glass, which are removable with alkaline solutions.

It has been known for some time that aqueous adhesive preparations can be used for bonding water-permeable substrates. A major field of application, for example, is the labeling of bottles. For example, it is proposed in DE 195 21 564 A to form a wrap-around labeling adhesive system from a pickup adhesive and an overlap adhesive. The pickup adhesive is said to have high wet adhesive strength and to consist of 5 to 85% by weight of a water-soluble polymer based on casein, starch, dextrin, glucose, polyvinyl alcohol, polyvinyl urethane or polyacrylic acid.

DE-OS 21 07 651 describes a process for the production of a mechanically stable polymer latex consisting of hydrophobic monomers and carboxyfunctional monomers. Besides the production of the latices, the document also describes their use for the treatment of textiles or for pigmenting in the production of pigmented paints. However, there is no suggestion that neutralization products of the latex are suitable as adhesives.

WO 93/03111 describes water-containing adhesives for the labelling of bottles. These labelling adhesives are based on a glue, a rosin, a synthetic resin and monohydric or polyhydric alcohols. There is no reference to the use of specific modified polymers.

EP 1025179 A1 describes water-containing adhesives for hydrophobic substrates which contain an acrylic copolymer based on a combination of acid group bearing monomers and hydrophobic monomers. Additionally the generally known additives may be present in such adhesive dispersion.

Although hydrophobic surfaces can be bonded well with casein-based glues, unpleasant odors can be emitted under adverse conditions in industrial cleaning processes used to remove the labels. The use of (meth)acrylic acid polymers will avoid such odors but such adhesives have some disadvantages in its adhesion properties under different environmental conditions. So it is necessary that labels glued on a substrate with such adhesive shall be stable under wet and cold conditions during storage but shall be easily washed-off in the process of recycling.

Accordingly, the problem addressed by the present invention was to develop an aqueous adhesive composition which would develop high adhesive strength on solid surfaces especially also on a wet surface, which would show good adhesion of the bonded labels to the substrate also under humid conditions which, in addition, would be easily removable in a recycling process by subjecting the adhesive to alkaline solutions.

This problem is solved by providing an aqueous adhesive composition containing based on solid content (A) 20 to 80% by weight of a (meth)acrylic copolymer as dispersion in water, (B) 10 to 50% by weight of a resin, (C) 5 to 30% by weight of a reaction product in form of a dispersion of i) 20 to 50% based on total dispersion (C) of a (meth)acrylic copolymer having an acid number of 1 to 100 mg KOH/g, ii) 5 to 40% based on total dispersion (C) of at least one sugar alcohol with a $M_N$ of 100 to 600 g/mol, and reacting the mixture in alkaline solution for 0.1 to 6 hours, (D) 0.1 to 30% by weight of one or more auxiliaries wherein the sum A to D adds to 100%.

Aqueous adhesive shall mean that the adhesive and the main components shall be soluble or dispersible in water. The components shall be mixed in form of dispersions or they may be dissolved in an aqueous solution of one component. The adhesive shall be applied on the substrate and provide a layer of a pressure sensitive adhesive. Water re-dissolvable means that the adhesive after application between the substrate surfaces during a later recycling process can be dissolved or dispersed to such an extent that the substrates are separating.

One component of the adhesive is a dispersion of an (meth) acrylic copolymer in water (A). Such (meth)acrylic copolymers shall consist of the known unsaturated monomers based on (meth)acrylic acid and its esters and such monomers which are copolymerizable with such (meth)acrylate monomers. The copolymers used in accordance with the present invention are preferably formed by copolymerization of at least one monomer of hydrophobic type with at least one monomer of a hydrophilic type, and optionally other monomers containing at least one carboxylic group.

Monomers of the hydrophobic type are components, i.e. copolymerized monomers which form a discrete, disperse organic liquid phase in water as the continuous phase under the emulsion copolymerization conditions according to the invention. Suitable monomers of this type are esters of unsaturated polymerizable carboxylic acids, more particularly acrylic and methacrylic acid, aromatic vinyl compounds, such as styrene, a-methyl styrene and vinyl toluene, esters of vinyl alcohol, more particularly fatty acid vinyl ester, higher N-alkylamides of unsaturated polymerizable carboxylic acids, more particularly (meth)acrylic acid, and other copolymerizable olefinic monomers, for example of acrylonitrile and methacrylonitrile, vinyl chloride or vinylidene chloride type, and olefins, such as ethylene, butadiene, isoprene and comparable olefins with no other functionality. The esters of acrylic acid and methacrylic acid, more especially corresponding esters with lower monohydric alcohols, such as C1 to C8 alcohols, above all the corresponding methyl, butyl, 2-ethylhexyl and/or ethyl esters, are of particular importance. Aromatic vinyl compounds of the styrene type are also particularly suitable. Esters of vinyl alcohol and olefins with no other functionality are less preferred. Such monomers, besides their hydrophobic properties, do not contain a group directly forming a salt.

The second group of monomers are the hydrophilic type. Suitable monomers are co-polymerizable monomers which contain polar substituents of which typical examples are acrylamide, methacrylamide, hydroxyethyl acrylate or methacrylate, hydroxyethyl acrylamide and N-vinyl pyrrolidone. Other monomers of this type are hydroxyalkyl(meth)acrylates as hydroxypropyl acrylate or methacrylate, hydroxybutyl acrylate, partial esters of glycerol and acrylic acid.

Whereas monomers of hydrophilic and hydrophobic type are always used in the production of such acrylic copolymer, the use of the monomers which contain acidic groups is optional. Carboxyfunctional comonomers are particularly useful in this regard. Preferred examples are acrylic acid, methacrylic acid, itaconic acid and/or crotonic acid. Maleic acid, fumaric acid or semi-esters thereof are less preferred. Other examples of components of this class are unsaturated monomers containing sulfonic acid groups. Such monomers can form ionic groups in an aqueous phase. Such ionic groups will improve the solubility of the polymer in water.

Typically the molar ratio of hydrophobic monomers to the monomers containing hydrophilic groups is selected so that at least 50 mol-% of hydrophobic monomers and at least 5 mol-% of monomers containing hydrophilic groups are used. Optionally, up to 20 mol-% of the hydrophilic monomers can be replaced by monomers containing acid groups. The copolymer shall have a molecular weight (number average molecular weight, $M_N$, obtainable by GPC) between 10,000 to 500,000 g/mol, preferably less than 300,000 g/mol, the acid number is 0 or up to 50 mg KOH/g. It is preferred to select monomers so that the glass transition temperature $T_g$ (measured by DSC, DIN ISO 11357) of the (meth)acrylic copolymer is less than 0° C., preferably less than −10° C.

For the preparation of the adhesive, the (meth)acrylic copolymers are preferably present in the form of aqueous solutions or dispersions. The dispersion may contain at least one emulsifying agent in an amount which will render the copolymer water dispersible or it shall be soluble or dispersible in water by neutralization of at least part of the acidic groups, e.g. the carboxylic groups. Any standard oil-in-water emulsifiers or emulsifier systems (nonionic, anionic or cationic surfactants) may be used. Such copolymers and dispersions are commercially available. The copolymer shall be used in an amount of 20 to 80% by weight of the solid adhesive composition.

The aqueous adhesive shall contain at least one tackifying resin (B). The resin provides additional tackiness and improves the compatibility of the adhesive components. The resin is preferably selected from hydroabietyl alcohol and its esters, more particularly its esters with aromatic carboxylic acids, such as terephthalic acid and phthalic acid; modified natural resins, such as resin acids from gum rosin, liquid rosin or wood rosin, for example fully saponified gum rosin or alkyl esters of optionally partly hydrogenated pine rosin with low softening points, such as for example methyl, diethylene glycol, glycerol and pentaerythritol esters; resins based on functional hydrocarbon resins; SAA resins (copolymers of styrene and allyl alcohol); terpene-phenol resins or ketone resins.

Suitable resins are preferably rosins. Rosins are amorphous masses with average molecular weights below 2,000 g/mol. They are obtained from the crude resin of conifers. Also derivatized rosins, for example hydrogenated or disproportionated rosins, are preferably used, the objective of derivatization, for example saponification or addition of maleic acid, being above all to increase solubility or dispersibility in water. Suitable rosins and derivatives thereof are gums, liquid and wood rosins. The acid number of such rosin is between 0 to 300 mg KOH/g, preferably between 70 to 220 mg KOH/g.

The resin is intended to tackify the adhesive layer and to improve the compatibility of the adhesive components. It is preferably used in a quantity of 10 to 50% by weight (solids). The resin can be supplied in form of a dispersion. In such case an emulsifier is incorporated in the dispersion or/and a soluble resin is selected. To achieve a high solid content of the adhesive preferably the solid content of such dispersion of resin shall be between 45 to 65% by weight. As alternative the resin shall be dispersed in the aqueous phase of the acrylic copolymer (A). In a preferred embodiment of the invention, 15 to 35% by weight of the adhesive of at least one water dispersible or water soluble resin is used. Resins and especially rosins are commercially available also in form of dispersions.

Another component of an adhesive according to the invention is a reaction product (C) of a (meth)acrylic copolymer with at least one sugar alcohol in aqueous solution. The adhesive according to the invention shall contain 5 to 30% by weight of such polymeric reaction product. It shall be included in the adhesive in form of a dispersion. The (meth) acrylic copolymer may consist of the same unsaturated monomers as listed above. The molecular weight ($M_N$) of such polymer is about 100,000 to 1,000.000 g/mol, preferably less than 500,000 g/mol. The copolymer shall contain carboxylic groups which can be transferred to ionic groups at least partly. The acid number shall be 1 to 100 mg/KOH/g, preferably more than 20 mg KOH/g. The glass transition temperature $T_g$ of the (meth)acrylic polymer is more than 0° C., preferably more than 10° C. Such copolymers are dispersed in water. Such dispersions are commercially available. Such dispersion may contain additives which are required to achieve a good stability and processability, for example pH-regulator, defoamer, emulsifier or stabilizer. The (meth) acrylic polymer shall be different from the component (A), for example in its acid number, in its molecular weight or in its composition of monomers.

Sugar alcohols suitable for the reaction are sugar-like polyols and are formed, for example, from monosaccharides by reduction of the carboxyl group. The sugar alcohols used in accordance with the present invention are liquid or solid polyols at room temperature and contain 4 to 14 hydroxyl groups per molecule and may have a melting point of 50 to 200° C. The sugar alcohols used preferably have a molecular weight $M_N$ of 100 to 600 g/mol and preferably in the range from 150 to 500 g/mol.

The sugar alcohols are preferably selected from the group of alditols, more particularly from the group of tetritols, pentitols or hexitols. Actual examples are arabitol, dulcitol, erythritol, mannitol, ribitol, sorbitol or xylitol or mixtures thereof. In a particularly preferred embodiment, mannitol and/or sorbitol is used as the sugar alcohol. In another embodiment of the invention, hydrogenated saccharides, more particularly hydrogenated disaccharides, are used as the sugar alcohols either on their own or in admixture with at least one alditol. In a particularly preferred embodiment of the invention, the sugar alcohol used is selected from 1,1-GPM (1-0-α-D-glucopyranosyl-D-mannitol), 1,6-GPS (6-0-α-D-glucopyranosyl-D-sorbitol), maltitol or lactitol individually, in admixture with one another and/or in admixture with at least one alditol. Other suitable sugar alcohols are hydrogenated glucose syrup, maltitol syrup, pentaerythritol, dipentaerythritol or polydextrose.

In one embodiment of the invention, up to 30% by weight of the sugar alcohol, based on the weight of the sugar alcohol, is replaced by at least one polyol liquid at room temperature. Suitable liquid polyols are, in particular, glycerol or polyglycerols, such as diglycerol, pentaglycerol or decaglycerol. Correspondingly liquid alkoxylated polyglycerols may also be used. The liquid polyols may be used individually or in the form of mixtures. If, from their synthesis, the sugar alcohols used contain constituents with fewer than 4 or more than 14 hydroxy groups per molecule, the percentage content of constituents containing 4 to 14 hydroxyl groups per molecule is more than 70% by weight, based on the total weight of the sugar alcohol used.

To form the reaction product of (i) the (meth)acrylic copolymer and (ii) a sugar alcohol both components are mixed in aqueous form. The sugar alcohol can be used in solid or liquid form or as an aqueous solution. It is mixed with the (meth)acrylic copolymer dispersion. The mixture shall contain 20 to 50% by weight of the (meth)acrylic copolymer, preferably 30 to 40%, and 5 to 40% of at least one sugar alcohol, preferably 10 to 30% by weight, the rest of the dispersion shall consist of water. The pH of the solution is adjusted to pH 7 to 9 by the addition of an anorganic base for example LiOH, NaOH, KOH, $Na_2CO_3$ or $Ca(OH)_2$. Then the solution is allowed to react under agitation at temperatures between 20 to 60° C. for 0.1 to 6 h, preferably from 25 to 50° C. for 0.25 to 3 h. If the temperature is higher the reaction time can be reduced. During the reaction the mixture shall contain about 30 to 80% water. Without any restriction it is assumed that the part of the carboxylic groups may form bonds with some OH-groups of the sugar alcohol. The resulting dispersion is stable and can be stored before further use.

The adhesives according to the invention may contain other raw materials and auxiliaries (D) typically encountered in labelling adhesives or may be mixed or blended with typical labelling adhesives. For example, polysaccharides, such as native starches, degraded starches, chemically modified starches, dextrins or proteins, other water-soluble or -dispersible, preferably self-dispersing polymers, for example polyalkylene oxides, polyvinyl alcohols, polyvinyl pyrrolidones, copolymers of vinyl pyrrolidone with vinyl monomers, acrylic acid or esters thereof, copolymers of vinyl acetate and chemical reaction products thereof may be used to improve wet adhesive strength. Of these materials, starch, starch derivatives, dextrin and cellulose ethers are preferred. Suitable starch derivatives may be obtained by reacting native or degraded starch, for example oxidatively degraded starch. Such polymers or polysaccharides are commercially available.

Other auxiliaries which may be used in the adhesive composition according to the invention are auxiliaries for controlling the open time, more particularly from the class of alcohols. Sugars, mono-, di- or polyalcohols, for example, are suitable as auxiliaries for controlling the open time.

In addition, the adhesives according to the invention may contain other additives to obtain special properties, for example in regard to viscosity, which can be regulated in known manner by addition of certain water-soluble low-molecular weight liquefiers, like urea, thiourea and/or dicyanodiamide; storage life with known preservatives, like benzoates, fluorides; processing properties, for example antifoam agents or wetting agents, like stearates, silicone oil and addition products of ethylene oxide or propylene oxide with fatty alcohols; color, using dyes, pigments or fillers; and surfactants. These auxiliaries selected from preservatives, defoamers, dyes, pigments, additives improving wet adhesive strength, additives for adjusting the open time, pH regulating substances and/or other typical auxiliaries are generally used in quantities from 0.1 to 30% by weight and preferably in quantities of 0.5 to 15% by weight.

The adhesives to be used in accordance with the invention are prepared in known manner by mixing the components. It may be advisable initially to prepare a dispersion of the (meth)acrylic copolymer (A), adding a dispersion of the resin (B) or dissolving the resin in the copolymer and then to add an aqueous solution/dispersion of reaction product C. As last step the auxiliaries are added and mixed, the pH value shall be corrected and the solid content can be adjusted with water.

The solids concentration of the adhesive may vary within wide limits, for example between 30 and 75% by weight and, more particularly, between 40 and 65%. It is preferred to use the aqueous neutral solutions as adhesives. Neutralization may be carried out with a non-volatile base, such as an alkali metal hydroxide, or a non-volatile amine, for example triethanolamine. The pH shall be adjusted from 5.5 to 8.5 preferably from 6 to 8.

The viscosity of the final adhesive is normally in the range from 200 to 300,000 mPas and, more particularly, in the range from about 500 to 30.000 mPas at 23° C. (Brookfield RVT, ISO 2555). The viscosity is selected according to the temperature during the application process and according to the application method. If the application temperature is increased, for example from 30 to 50° C., an adhesive can be applied which has a viscosity in the upper range. Additionally the application means as for example nozzles, rollers, blades, will require a specific selection of the viscosity.

In one preferred embodiment of the present invention, the aqueous adhesive contains 35 to 70% by weight of at least one (meth)acrylic copolymer A in aqueous dispersion, 15 to 35% by weight of at least one water dispersible rosin B, preferably as dispersion, 7.5 to 20% by weight of a reaction product of a (meth)acrylic copolymer with an acid number of 1 to 100 mg KOH/g and a sugar alcohol with a molecular weight from 100 to 600 g/mol as dispersion and 0.5 to 15% by weight of auxiliaries and additives, whereby the sum of the components shall amount to 100% solids.

The aqueous adhesive is stable and shall be applied to the label directly to form an adhesive layer or it shall be applied to a transfer film to form a suitable layer which thereafter is transferred to the label surface. The coating process typically is performed at temperatures about room temperature, i.e. at temperatures in the range from 15 to about 40° C., preferably up to 30° C. Although, in principle, the adhesives could be applied at higher temperatures, this is less preferred for machinery reasons.

The aqueous adhesive according to the invention can be used for bonding flat substrates, like paper, films, labels on hard substrates. Preferably the adhesive is used for labelling of reusable substrates especially containers. The containers to be labeled in accordance with the present invention are, in particular, hollow containers, such as bottles, cans, drums, tubes or cartridges, which are essentially based on optionally plated or electroplated metal, for example tin plate or aluminium, glass, ceramics or thermoplastics, such as polyethylene terephthalate, polycarbonate, polyethylene, polypropylene, polyvinyl chloride or polystyrene. The labels consist of thermoplastics, such as polyethylene, polypropylene, polystyrene, polyvinyl chloride, oriented polypropylene or cellophane or of paper, hydrophobicized paper, lacquered paper, or laminated paper. The shape of the labels does not have to meet any particular requirements. A preferred embodiment uses the adhesive for labelling hydrophilic labels like paper or hydrophilic films on surfaces of hard substrates like glass or thermoplastic bottles. Such bottles are used in particular for mineral waters, refreshing drinks or alcoholic drinks.

The adhesive according to the invention can be used in all conventional application processes. The adhesive is applied to the label and shall form a solid coating layer of about 5 to 50 g/m$^2$, for example 20 g/m$^2$. Such coated label can be stored prior to use or it is joined with the surface of the container immediately after manufacture. The surface of the substrate can be dry or wet. The adhesive provides an improved green strength on the substrates, the labels will stay in place during further processing of the bottles. The adhesive provides a good stability to humid conditions. Under normal wet conditions like rain, fog or snow, the labels will remain in place and will not slip on the surface.

The adhesive according to the invention shall be re-dissolvable. The bonded substrates can be recycled. In a conventional recycling process, the containers labeled with redispersible adhesives are sorted according to the type of the container and then washed in an energy-intensive and laborious washing process. All impurities have to be removed as far as possible from the container order to ensure a high level of cleanness. Wash liquor concentrations of up to 2% NaOH and temperatures of 50 to 90° C. are typical of the washing process. The residence time can be up to 20 minutes but usually is below 5 minutes. The adhesive according to invention is dissolved or dispersed in the wash liquor and can be removed together with the label.

The aqueous adhesive according to the invention shows improved properties in its application on fast running labelling machines. The bonded labels show better adhesive force and will stay in place in the manufacturing process and under humid or cold conditions during storage. Also it will be noticed that no kind of migration of chemical substances through a paper label will occur. A dried film of the adhesive is transparent and can be used for polymer film or paper labels. The bottles can be easily separated from the labels in the recycling process. The wash-off performance will remain stable after aging the substrate/label laminate.

EXAMPLE 1

Adhesive 20 g of an acrylic copolymer dispersion (solid content 50%, acid number about 50 mg KOH/g, $T_g$<−40° C.) is mixed with 20 g of hydrogenated maltitol solution (30% solids). 1 g of NaOH is added and the solution is stirred and warmed to 40° C. for 2 h to form an acrylate reaction product.

To 50 g of a dispersion of an (meth)acrylic copolymer (solid content 65%, pH about 4, $T_g$>10° C.), 30 g of a dispersion of a rosin ester (50% solids) is added and mixed. 15 g of the reaction product as described above is added and mixed for 15 min.

Then a wetting agent (2 g) is added and mixed. The solid content of the adhesive is adjusted with water to 53% and NaOH is added to pH 8.

EXAMPLE 2

Bonding

Using the adhesive of ex. 1 a silicon release liner was coated with an adhesive layer and dried thereafter (about 20 g/m² dry film). This adhesive film was transferred to commercially available paper labels. The label and a glass substrate are brought together under light pressure.

Wet Adhesion:

The label was applied to a humid substrate. No slipping of the label was observed.

A similar sample was prepared and after drying the bottle was filled with cold water (4° C.). No slipping of the label was observed.

After 24 h of drying the samples a test for adhesion results in fiber tears.

Ice Water Test:

The samples were stored for 7 d at 50° C./70% rel. humidity.

The samples were immersed in ice water.

The labels were not removed within 1 h.

Wash-Off Test:

The samples are dried for 7 d at 50° C./70% rh.

The labels were removed by immersing the substrates in a 1.2% NaOH solution at 75° C. By slight agitation of the samples the labels were separated from the substrates in less than 10 minutes.

COMPARATIVE EXAMPLE

An adhesive was prepared wherein all components A, B, Ci, Cii, D were mixed in the same amounts at room temperature without reaction.

Labels bonded to glass substrates show less green strength and the wash-off test needs longer soaking time.

The invention claimed is:

1. An aqueous adhesive comprising:
   (a) 20 to 80% of an (meth)acrylic copolymer (A) as dispersion in water;
   (b) 10 to 50% of a resin (B);
   (c) 5 to 30% of a dispersion reaction product (C) prepared from the reaction of
      i) 20 to 50%, based on the total dispersion of (C), of an (meth)acrylic copolymer (Ci) having an acid number of 1-100 mg KOH/g and
      ii) 5 to 40%, based on the total dispersion of (C), of a sugar alcohol (Cii) which has a $M_N$ range of 100 to 600 g/mol
   in an alkaline solution for 0.1 to 6 hours;
   (d) 0.1 to 30% an auxiliary (D)
   wherein the % of components (A), (B), (C) and (D) are based on solid content and the total adds to 100%.

2. The aqueous adhesive of claim 1 wherein the adhesive has a solid content of 40 to 65% by weight.

3. The aqueous adhesive of claim 1 wherein the dispersion reaction product (C) was prepared from 25 to 45% of a (meth) acrylic copolymer (Ci) having a molecular weight from 100,000 to 1,000,000 g/mol and 10 to 30% of a sugar alcohol (Cii) with a $M_N$ range of 100 to 500 g/mol.

4. The aqueous adhesive of claim 3 wherein the sugar alcohol is a hydrogenated mono- or disaccharide.

5. The aqueous adhesive of claim 1 wherein the (meth) acrylic copolymer (A) has a $T_g$ value less than 0° C. and the (meth)acrylic copolymer (Ci) has $T_g$ value greater than 0° C.

6. The aqueous adhesive of claim 1 wherein the adhesive has a viscosity of 200 to 300,000 mPas at 23° C.

7. The aqueous adhesive of claim 1 wherein the resin (B) is a rosin which has an acid number range of 0 to 300 mg KOH/g.

8. An aqueous adhesive of claim 1 wherein the auxiliary is selected from the group consisting of preservatives, defoamers, dyes, pigments, pH regulating substances, fillers, additives improving wet adhesive strength, additives for adjusting the open time and mixtures thereof.

9. An article comprising the aqueous adhesive of claim 1.

10. The article of claim 9 comprising a label bonded to a substrate.

11. The article of claim 10 wherein the label is a paper or a hydrophilic film.

12. The article of claim 11 wherein the label is a paper label.

13. The article of claim 10 wherein the substrate is a thermoplastic, metal or glass substrate.

14. The article of claim 10 wherein the substrate is a glass substrate.

15. A method of applying the adhesive of claim 1 comprising (a) applying the adhesive onto a label or a transfer film, (b) applying the label or the film onto a substrate, and thereby bonding the label onto the substrate.

16. The method of claim 15 wherein the substrate is wet.

17. A method of recycling the article of claim 10 comprising washing the article in a 2% NaOH solution at 50-90° C. for up to 20 minutes, thereby disassociating the label from the substrate.

18. A method of preparing the adhesive of claim 1 comprising:
   (1) preparing the dispersion of (meth)acrylic copolymer (A);
   (2) adding the dispersion of resin (B);
   (3) adding the dispersion reaction product of (C); and
   (4) adding the auxiliary (D)
   in a chronological step.

19. The method of preparing the adhesive of claim 18 wherein the dispersion of resin (B) is dissolved in the dispersion of (meth)acrylic copolymer (A) before the third step.

* * * * *